United States Patent
Eastlake, III

(10) Patent No.: US 12,445,315 B2
(45) Date of Patent: Oct. 14, 2025

(54) METHOD FOR IMPROVED LAYER 2 ADDRESS ACQUISITION

(71) Applicant: HUAWEI TECHNOLOGIES CO., LTD., Shenzhen (CN)

(72) Inventor: Donald E. Eastlake, III, Apopka, FL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 18/356,732

(22) Filed: Jul. 21, 2023

(65) Prior Publication Data
US 2023/0362128 A1    Nov. 9, 2023

Related U.S. Application Data

(63) Continuation of application No. PCT/US2022/013405, filed on Jan. 21, 2022.

(60) Provisional application No. 63/140,677, filed on Jan. 22, 2021.

(51) Int. Cl.
| | |
|---|---|
| *H04L 9/00* | (2022.01) |
| *H04L 9/08* | (2006.01) |
| *H04L 9/32* | (2006.01) |
| *H04L 61/5092* | (2022.01) |
| *H04L 101/622* | (2022.01) |

(52) U.S. Cl.
CPC .............. *H04L 9/50* (2022.05); *H04L 9/0869* (2013.01); *H04L 9/3213* (2013.01); *H04L 61/5092* (2022.05); *H04L 2101/622* (2022.05)

(58) Field of Classification Search
None
See application file for complete search history.

(56) References Cited

U.S. PATENT DOCUMENTS

| | | | | |
|---|---|---|---|---|
| 7,096,257 B2 * | 8/2006 | Trisno | ...................... | H04J 1/065 |
| | | | | 709/222 |
| 10,218,671 B2 * | 2/2019 | Pang | ................... | H04L 61/5038 |
| 2014/0173682 A1 | 6/2014 | Liang et al. | | |

(Continued)

OTHER PUBLICATIONS

Droms, R., "Dynamic Host Configuration Protocol," Network Working Group, RFC 2131, Mar. 1997, 45 pages.

(Continued)

*Primary Examiner* — Lashonda Jacobs-Burton
(74) *Attorney, Agent, or Firm* — Conley Rose, P.C.

(57) ABSTRACT

A method for performing self-assignment Layer 2 address acquisition implemented by a client device. The method includes the client device selecting a Media Access Control (MAC) address and generating an outgoing test message that includes a first hash token to test an availability of the selected MAC address. The first hash token includes a K generation hash ($H_K$) value of a seed known only to the client device, where K is an integer value greater than one. The method further includes the client device sending the outgoing test message; determining based on a response to the outgoing test message or a lack of a response to the outgoing test message that the selected MAC address is not in use, and using the selected MAC address based on the determination that the selected MAC address is not in use.

20 Claims, 7 Drawing Sheets

(56) References Cited

U.S. PATENT DOCUMENTS

2022/0224671 A1* 7/2022 de la Oliva ............ H04L 61/59
2025/0184306 A1* 6/2025 Sevin ................ H04L 61/5038

OTHER PUBLICATIONS

Eastlake, D., III, et al., "Randomness Requirements for Security," Network Working Group, RFC 4086, Jun. 2005, 48 pages.

Eastlake, D., III, et al., "IANA Considerations and IETF Protocol and Documentation Usage for IEEE 802 Parameters," Internet Engineering Task Force (IETF), RFC 7042, Oct. 2013, 27 pages.

Mrugalski, T., et al., "Dynamic Host Configuration Protocol for IPV6 (DHCPv6)," Internet Engineering Task Force (IETF), RFC 8415, Nov. 2018, 154 pages.

Volz, B., et al., "Link-Layer Address Assignment Mechanism for DHCPv6," Internet Engineering Task Force (IETF), RFC 8947, Dec. 2020, 18 pages.

Bernardos, CJ., et al., "Structured Local Address Plan (SLAP) Quadrant Selection Option for DHCPv6," Internet Engineering Task Force (IETF), RFC 8948, Dec. 2020, 13 pages.

De La Olivia, A., et al., "Protocol for Assignment of Local and Multicast Addresses (PALMA)," Interdigital, UC3M, IEEE 802.1CQ, Jun. 30, 2022, 18 pages.

Lamport, L., "Password Authentication with Insecure Communication," SRI International, Communications of the ACM. vol. 24, No. 11, Nov. 1981, 3 pages.

"Federal Information Processing Standards Publication Secure Hash Standard (SHS)," FIPS PUB 180-4, Information Technology Laboratory National Institute of Standards and Technology Gaithersburg, MD 20899-8900, Aug. 2015, 36 pages.

Hu, C.H., et al., "Efficient Constructions for One-way Hash Chains," ACNS 2005, LNCS 3531, pp. 423-441.

Zhao, Y., et al., "An Improved Elegant Method to Re-initialize Hash Chains," Department of Information Engineering, Beijing University of Posts and Telecommunications, Jan. 18, 2005, 8 pages.

"Information Technology—Open Systems Interconnection—Base Reference Model: The Basic Model" ISO/IEC 7498-1, Second Edition Nov. 15, 1994, 6 pages.

"T/Key: Second-Factor Authentication From Secure Hash Chains," arXiv:1708/08424v1, CCS '17, Oct. 30-Nov. 3, 2017, 17 pages.

* cited by examiner

PARTY B
FIRST DEVICE

PARTY C
SECOND DEVICE

MESSAGE $C_{M-1}$

MESSAGE $B_{N-1}$

OTHER FIELDS ...   $T^B_{N-1} = H^B_{K+1} \oplus HASH(C_{M-1})$

MESSAGE $C_M$

OTHER FIELDS ...   $T^C_M = H^C_J \oplus HASH(B_{N-1})$

MESSAGE $B_N$

OTHER FIELDS ...   $T^B_N = H^B_K \oplus HASH(C_M)$

MESSAGE $C_{M+1}$

OTHER FIELDS ...   $T^C_{M+1} = H^C_{J-1} \oplus HASH(B_N)$

*FIG. 3*

METHOD FOR IMPROVED LAYER 2 ADDRESS ACQUISITION

CROSS-REFERENCE TO RELATED APPLICATION

This application is a continuation of International Patent Application No. PCT/US2022/013405 filed on Jan. 21, 2022, by Futurewei Technologies, Inc., and titled "Method for Improved Layer 2 Address Acquisition," which claims the benefit of U.S. Provisional Patent Application No. 63/140,677 filed on Jan. 22, 2021, by Futurewei Technologies, Inc., and titled "Hash Chaining Improvements." The aforementioned applications are incorporated by reference in their entireties.

TECHNICAL FIELD

The present disclosure is generally related to network communications, and in particular to various embodiments of systems and methods that improve Layer 2 address acquisition.

BACKGROUND

A hash function is a function that can be used to map data of variable-length size to fixed-size values that are not invertible. The values returned by a hash function are called hash values, hash codes, digests, or simply hashes. It is common for the length of the output of a hash function to be a multiple of 8-bit bytes since modern computers are typically more efficient at processing 8-bit bytes or multiples thereof. Hash chains, that is a series of values produced by iterating a hash function, can be used to authenticate the source of a series of messages.

SUMMARY

A first aspect relates to a method for performing self-assignment Layer 2 address acquisition implemented by a client device. The method includes the client device selecting a Media Access Control (MAC) address and generating an outgoing test message that includes a first hash token to test an availability of the selected MAC address. The first hash token includes a K generation hash ($H_K$) value of a seed known only to the client device, where K is an integer value greater than one. The method further includes the client device sending the outgoing test message; determining based on lack of response to the outgoing test message that the selected MAC address is not in use; and using by the client device the selected MAC address.

Optionally, in a first implementation according to the first aspect, the method further includes the client device receiving an incoming test message testing the availability of the selected MAC address; generating a defense message that includes a second hash token in response to the incoming test message, the second hash token comprising a reversible combination of a K−1 generation hash ($H_{K-1}$) value of the seed and a hash of the outgoing test message; and sending the defense message.

Optionally, in a second implementation according to the first aspect or any implementation thereof, the method further includes the client device generating a first use advertisement message that includes a second hash token comprising a reversible combination of a K−1 generation hash ($H_{K-1}$) value of the seed and a hash of the outgoing test message, wherein the first use advertisement message advertises a use of the selected MAC address; and sending the first use advertisement message.

Optionally, in a third implementation according to the first aspect or any implementation thereof, the method further includes the client device generating a second use advertisement message that includes a third hash token comprising a reversible combination of a K−2 generation hash ($H_{K-2}$) value of the seed and a hash of the first use advertisement message, wherein the second use advertisement message advertises the use of the selected MAC address; and sending the second use advertisement message.

Optionally, in a fourth implementation according to the first aspect or any implementation thereof, the method further includes the client device generating a release message that includes a second hash token comprising a reversible combination of a K−1 generation hash ($H_{K-1}$) value of the seed and a hash of the outgoing test message, wherein the release message indicating a release of the selected MAC address; and sending the release message.

Optionally, in a fifth implementation according to the first aspect or any implementation thereof, the method further includes the client device generating a message that includes a hash token comprising a reversible combination of an X generation hash value of the seed and a hash of a last message sent by the client device, where X generation hash is equal to one less than a last generation hash used in generating a last hash token included in the last message sent by the client device; and sending the message.

Optionally, in a sixth implementation according to the first aspect or any implementation thereof, the reversible combination uses an exclusive-or (XOR) operation.

Optionally, in a seventh implementation according to the first aspect or any implementation thereof, the reversible combination uses a bitwise negation of an exclusive-or (XOR) operation.

A second aspect relates to a method for performing server-assigned Layer 2 address acquisition implemented by a client device. The method includes the client device sending a discover message to identify a server available to the client device, wherein the discover message includes a first outgoing hash token comprising a K generation hash ($H_K$) value of a first seed known only to the client device, where K is an integer value greater than one; receiving a server response message to the discover message from the server, wherein the server response message includes a first incoming hash token comprising a J generation hash ($H_J$) value of a second seed known only to the server; and sending a server selection message to the server, wherein the server selection message includes a second outgoing hash token comprising a reversible combination of a K−1 generation hash ($H_{K-1}$) value of the first seed and a hash of the server response message.

Optionally, in a first implementation according to the second aspect, the method further includes the client device storing the J generation hash ($H_J$) value of the second seed.

Optionally, in a second implementation according to the second aspect or any implementation thereof, the method further includes the client device storing a hash of the server selection message.

Optionally, in a third implementation according to the second aspect or any implementation thereof, the method further includes the client device receiving an assignment message from the server that includes a second incoming hash token comprising a reversible combination of a J−1 generation hash ($H_{J-1}$) value of the second seed and a hash of the server selection message, wherein the assignment message confirms or refuses an assignment of a Layer 2 address.

Optionally, in a fourth implementation according to the second aspect or any implementation thereof, the method further includes the client device determining whether a hash of the J−1 generation hash ($H_{J-1}$) value is equal to the $H_J$ value stored by the client device; and authenticating the assignment message was sent by the server and verifying the server selection message was received complete and unaltered by the server when the J−1 generation hash ($H_{J-1}$) value is equal to the $H_J$ value stored by the client device.

Optionally, in a fifth implementation according to the second aspect or any implementation thereof, the method further includes the client device generating a third outgoing hash token comprising a reversible combination of a K−2 generation hash ($H_{K-2}$) value of the first seed and a hash of the assignment message; and sending a server extension message that includes the third outgoing hash token to the server, wherein the server extension message requests a time extension of the assignment of the Layer 2 address.

Optionally, in a sixth implementation according to the second aspect or any implementation thereof, the method further includes the client device generating a third outgoing hash token comprising a reversible combination of a K−2 generation hash ($H_{K-2}$) value of the first seed and a hash of the assignment message; and sending a release message that includes the third outgoing hash token to the server, wherein the release message releases the assignment of the Layer 2 address.

Optionally, in a seventh implementation according to the second aspect or any implementation thereof, the reversible combination uses an exclusive-or (XOR) operation.

Optionally, in an eighth implementation according to the second aspect or any implementation thereof, the reversible combination uses a bitwise negation of an exclusive-or (XOR) operation.

A third aspect relates to a method for performing server-assigned Layer 2 address acquisition implemented by a server. The method includes the server receiving a discover message from a client device, wherein the discover message includes a first incoming hash token comprising a K generation hash ($H_K$) value of a first seed known only to the client device, where K is an integer value greater than one; generating a server response message to the discover message that includes a first outgoing hash token comprising a J generation hash ($H_J$) value of a second seed known only to the server; sending the server response message to the client device; and receiving a server selection message from the client device that includes a second incoming hash token comprising a reversible combination of a K−1 generation hash ($H_{K-1}$) value of the first seed and a hash of the server response message.

Optionally, in a first implementation according to the third aspect, the method further includes the server storing the K generation hash ($H_K$) value of the first seed.

Optionally, in a second implementation according to the third aspect or any implementation thereof, the method further includes the server storing a hash of the server response.

Optionally, in a third implementation according to the third aspect or any implementation thereof, the method further includes the server determining whether a hash value of the K−1 generation hash ($H_{K-1}$) value in the second incoming hash token is equal to the $H_K$ value stored by the server; and authenticating the server selection message was sent by the client device and verifying the server response message was received complete and unaltered by the client device when the hash value of the K−1 generation hash ($H_{K-1}$) value in the second incoming hash token is equal to the $H_K$ value stored by the server.

Optionally, in a fourth implementation according to the third aspect or any implementation thereof, the method further includes the server generating an assignment message that includes a second outgoing hash token comprising a reversible combination of a J−1 generation hash ($H_{J-1}$) value of the second seed and a hash of the server selection message, wherein the assignment message confirms or refuses an assignment of a Layer 2 address; and sending the assignment message to the client device.

Optionally, in a fifth implementation according to the third aspect or any implementation thereof, the method further includes the server receiving one of a server extension message or a release message from the client device that includes a third incoming hash token comprising a reversible combination of a K−2 generation hash ($H_{K-2}$) value of the first seed and a hash of the assignment message, wherein the server extension message requests a time extension of the assignment of the Layer 2 address, and the release message releases the assignment of the Layer 2 address.

Optionally, in a sixth implementation according to the third aspect or any implementation thereof, the method further includes the server determining whether a hash value of the K−2 generation hash ($H_{K-2}$) value in the third incoming hash token is equal to a $H_{K-1}$ value stored by the server; and authenticating the server extension message or the release message was sent by the client device and verifying the assignment message was received complete and unaltered by the client device when the hash value of the K−2 generation hash ($H_{K-2}$) value in the third incoming hash token is equal to the HK−1 value stored by the server.

Optionally, in a seventh implementation according to the third aspect or any implementation thereof, the reversible combination uses an exclusive-or (XOR) operation.

Optionally, in an eighth implementation according to the third aspect or any implementation thereof, the reversible combination uses a bitwise negation of an exclusive-or (XOR) operation.

A fourth aspect relates to a client device comprising a memory configured to store instructions; and a processor coupled to the memory and configured to execute the instructions, which when executed causes the client device to perform the method according to the first aspect or any implementation thereof.

A fifth aspect relates to a client device comprising a memory configured to store instructions; and a processor coupled to the memory and configured to execute the instructions, which when executed causes the client device to perform the method according to the second aspect or any implementation thereof.

A sixth aspect relates to a server comprising a memory configured to store instructions; and a processor coupled to the memory and configured to execute the instructions, which when executed causes the server to perform the method according to the third aspect or any implementation thereof.

BRIEF DESCRIPTION OF DRAWINGS

To describe the technical solutions in the embodiments of the present disclosure more clearly, the following briefly describes the accompanying drawings for describing the embodiments. It is clear that, the accompanying drawings in the following description show merely some embodiments of the present disclosure, and an ordinary person skilled in the art may derive other drawings from these accompanying drawings.

FIG. 3 is a schematic diagram illustrating an improved hash chaining security for a series of messages of a two-way message stream between a first device and a second device in accordance with an embodiment of the present disclosure.

DESCRIPTION OF EMBODIMENTS

Figure 1:
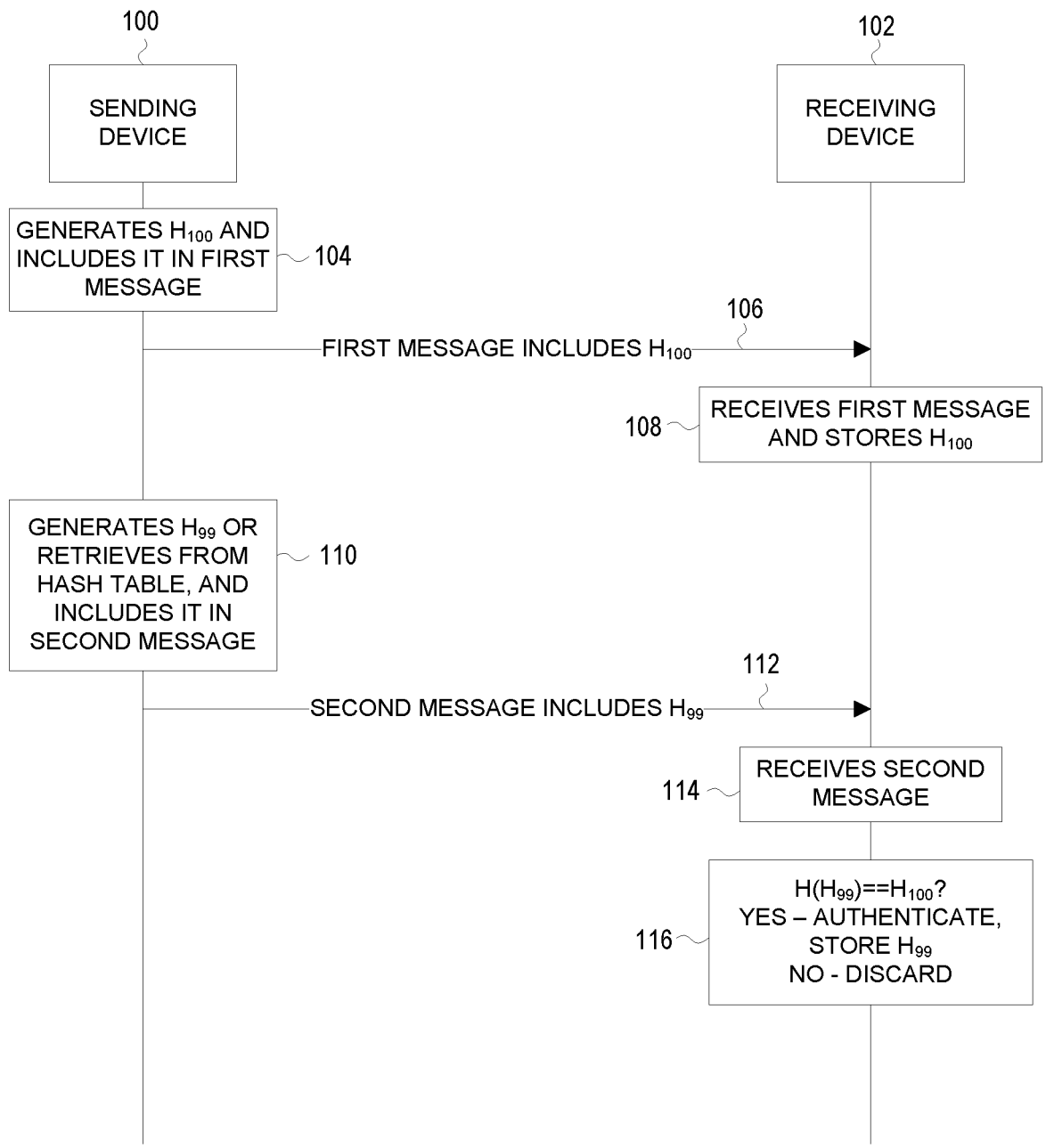
FIG. 1 is a schematic diagram illustrating hash chaining security process according to an embodiment of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides various embodiments of systems and methods that improve Layer 2 address acquisition. In particular, the disclosed embodiments apply hash chaining to improve the security and traceability of dynamic address assignment protocols, particularly those related to assignment of Layer addresses. A Layer 2 address is commonly called a Media Access Control (MAC) or link local address.

Devices on networks such as Ethernet require a Layer 2 address according to the International Organization for Standardization (ISO) network protocol layering model. The Layer 2 address, commonly called a "MAC" address, enables messages to be individually addressed to the devices. Bridges and switches that learn or are configured with routing information may route the messages to a device based on the Layer 2 destination address in a message.

Initially MAC addresses were simply divided into globally unique addresses and locally assigned addresses and orthogonally into unicast addresses and multicast addresses with the idea that the globally unique unicast addresses would represent hardware network interfaces and be built into those interfaces by their manufacturers. Globally unique MAC addresses are based on allocations by the Institute of Electrical and Electronics Engineers (IEEE) Registration Authority whose rules prohibit use of globally unique unicast addresses for other than hardware network interfaces. However, it is now very common for network connected virtual computers to be hosted on servers, particularly in data centers, and there is an explosion of small cheap network connected devices in the so-called Internet of Things (IoT) area. These virtual machines and IoT devices greatly increase the demand for MAC addresses and would lead to exhaustion of the supply of MAC addresses if only globally unique unicast addresses were used.

For a variety of purposes including support of dynamic local MAC address assignment, the IEEE, under the Structured Local Address Plan (SLAP), divided the "local" half of all MAC addresses and further split those addresses into four quadrants, one of which is specifically for use in local dynamically assigned addresses. The IEEE is developing a protocol, IEEE Std. 802.1CQ to perform such local dynamic assignment (see Protocol for Assignment of Local and Multicast Addresses (PALMA) in 802.1CQ). In addition, the Internet Engineering Task Force (IETF) has long had protocols for local dynamic assignment (e.g., Dynamic Host Configuration Protocol (DHCP) and DHCP version 6 (DHCPv6)), commonly used to assign Layer 3 Internet Protocol (IP) addresses and communicate other parameters. In the case of DHCPv6, this has been extended for Layer 2 address assignment. In addition, the IETF has standardized a way to specify from which quadrant of the formerly uniform local MAC address space a client is requesting an address with DHCPv6.

Existing solutions for obtaining a Layer 2 address for a virtual machine or for large numbers of IoT devices or the like depend on dynamic address assignment. There exist commercial products that do this, usually by taking an IEEE allocated prefix that was, as mentioned above, intended to be the basis for globally unique hardware device MAC addresses, and using that prefix to produce local dynamically unicast assigned MAC addresses in violation of IEEE guidelines.

When a logical device, such as a virtual machine (VM), or a physical device such as an IoT device needs an address, there are two main strategies. These strategies are server-assignment and self-assignment. Hybrids are also possible, such as starting with server-assignment and switching to self-assignment if no server appears to be available.

In self-assignment, an end-system selects a MAC address, commonly by selecting one at random from a configured range or ranges of MAC addresses, and sends out a test message to test if the selected MAC address is in use. A test message could be sent to a multicast address or the broadcast address so as to reach all stations currently on the local link. A test message could also be sent to the address being tested, but for this might not work if there are any bridges/switches in the link that do not know where to route that MAC address. The end system might have also been observing MAC addresses in traffic to record addresses that appear to have been in use recently, in which case the end system could avoid selecting such addresses. After the end system has selected an address that appears to not be in use, the end system starts using the address as its own. Thereafter, if any other station on the link tests the availability of that address, the station using the address answers the test message with a defense message to notify the testing station that the station using that address is holding the address. The station using that address might also periodically or occasionally send out a spontaneous message to advertise its claim to the address. When and if the end system decides to no longer use the address, because the end system is shutting down or for any other reason, the end system might send a release message notifying other stations on the link. Test, use advertisement, and release messages are sent to a broadcast or multicast address so that all stations on the local link have an opportunity to see them. An address defense response message sent in response to a test message might be unicast to the sender. However, an address defense response message is normally multicast or broadcast and because the address defense response message can thus act as or may actually be the same as a defense message.

In server-assignment, an end station client obtains an address from a centralized server. A typical sequence would be as follows: (a) The end station client sends out a discover message to find a server or servers that are available to the client. The discover message can include identification or authorization information for the client, information as to what the range is from which the client is requesting an address be allocated, and other information. (b) One or more servers respond to the discover message indicating if the server is willing to grant an address or block of addresses, for how long the server is willing to make such a grant, and possibly sending other configuration parameters or information. The servers might tentatively/temporarily reserve requested addresses at this time, but do not actually assign the requested addresses to the client as there may be multiple servers responding and the requested addresses would be wasted if the servers all assigned them to the client. (c) From the responses in step "b", the client selects the server that the client wants to use and sends a message specifically requesting the offered address(es) from that server. (d) The server responds with a positive acknowledgement confirming the assignment or a negative acknowledgement refusing the assignment. In the positive case, the server provides a "lease time" or the like indicating how long the client can use the address. During or towards the end of that time the client can send a message, similar to or the same as that in step "c", requesting to extend its lease. In the negative acknowledgement case, the client can try again with another server. Other messages are typically supported such as a message from the client/station releasing an address or addresses assigned to that client. Normally all of these messages are broadcast or multicast so that all the stations on the logical link see the messages. This way, for example, multiple servers can offer to assign addresses from the same address block, for reliability. Since a server can track what address offers by other servers have been accepted by a client, the probability of an address being assigned twice to different clients is low.

The present disclosure recognizes that a problem exists in that there is no way to reliably link successive messages produced by the same end station or server. An address self-assigning end station may send a sequence of roughly periodic messages to defend an address that the end station is using followed by a release message to indicate the end station has ceased using that address. However, a release message could be easily forged by some other end station on the link. Similarly, a client of server-assigned addresses and/or other server provided configuration parameters and the server the client elects to use can more reliably tie together their sequence of messages as described above. The problem is more acute in the case of a sequence of messages that are multicast or broadcast because, generally, many or all of the stations on a link will see such messages providing information the stations can use to forge subsequent messages that might appear to be in the same sequence.

To address the above issues, and other issues, the present disclosure describes various systems and methods that improve Layer 2 address acquisition. In particular, the disclosed embodiments apply hash chaining to improve the security and traceability of dynamic address assignment protocols, particularly those related to assignment of Layer 2 addresses. Inclusion of a hash chain token or tokens in messages provides stronger assurance that successive messages as described above come from the same source. This improved linkage of successive messages with the same source is also of benefit in debugging by reducing the possibility of confusion due to forged messages.

In an embodiment, for self-assigned addresses, the successive multicast/broadcast messages can have improved security by combining the previous message sent into the hash token so as to make such messages harder to forge. This improves the security and robustness of these self-assigned address methods.

In an embodiment, for server-assigned addresses, the messages exchanged between a client and server can have improved security by combining the previous message received into the hash token so as to make such messages harder to forge and gain some assurance of the receipt of previous messages. Note that these exchanged messages are normally multicast/broadcast.

As stated above, the disclosed embodiments employ the use of a hash token, which is generated using a hash function. A hash function is a function that can be used to map data of variable-length size to fixed-size values with the goal that the function be relatively easy to calculate, but infeasible to invert. For the given equation, H=Hash (X), H is the output of a hash function applied to the bit string X as input. Using a hash function, H is relatively easy to calculate given X. However, it is infeasible to find the bit string X given H. For instance, strong hash functions combine and use all the input bits so typically if even one bit of input is changed, about half the output bits are changed. An example of a strong hash function is the Secure Hash Algorithm (SHA) approved by the National Institute of Standards and Technology (NIST).

In addition, a hash function can be applied recursively where the output of a hash can be used as an input of the same hash function. A hash chain is the series of values obtained by repeatedly applying a hash function, so if:

$$H_1 = \text{Hash}(X)$$

$$H_2 = \text{Hash}(H_1) = \text{Hash}(\text{Hash}(X))$$

and generally $$H_N = \text{Hash}(H_{N-1}) = \text{Hash}(\text{Hash}(\ldots(\text{Hash}(X))\ldots))$$

that is, $H_N$ is the result of applying the function Hash N times recursively, the sequence $H_N, H_{N-1}, \ldots, H_2, H_1$ constitutes a hash chain.

Due to the fact that it is infeasible to find the bit string X given H as described above, a hash chain can be used for authenticating messages from a sending device. For example, referring to FIG. 1, assume that a sending device 100 is configured to send a sequence of messages to a receiving device 102. The receiving device 102 wants to be sure that the messages come from the sending device 100. The sending device 100 and the receiving device 102 both know the Hash function to use and how to find the hash token in a message based on a prior agreement, configuration, or because both the sending device 100 and the receiving device 102 are utilizing a standard concerning the exchanging of messages or the like.

At step 104, the sending device 100 starts by creating a random seed S (i.e., a random string of bits) known only to the sender and calculates a hash chain. For example, the hash chain can be of size 100, where $H_{100}$ is the result of applying a strong hash function to S one hundred times recursively as described above. The hash chain can be of any size greater than one. The sending device 100 then includes the value of $H_{100}$ in a first message. At step 106, the sending device 100 sends the first message that includes the value of $H_{100}$ to the receiving device 102. The hash value included in the message is referred to herein as a token or a hash token.

At step 108, when the receiving device 102 receives the first message, the receiving device 102 identifies the hash token in the message and stores the value of the hash token (in this case, the value of $H_{100}$) in memory.

When a second message is to be sent to the receiving device 102, the sending device 100, at step 110, has to determine the previous hash value H99, for example by recomputing the hash chain to obtain the value of $H_{99}$ (i.e., the result of applying the hash function to the seed S ninety-nine times recursively) or retrieve the value of $H_{99}$ from a hash table (if the sending device 100 has enough memory/storage capacity to have stored the results of all 100 hash values from the previous calculations in the hash table). The sending device 100 then includes the value of $H_{99}$ as a hash token in the second message.

At step 112, the sending device 100 sends the second message that includes the value of $H_{99}$ as the hash token to the receiving device 102. At step 114, the receiving device 102 receives the second message. At step 116, the receiving device 102 can verify the hash token by computing the hash of the hash token (i.e., Hash($H_{99}$)) and comparing the resulting value to the value of $H_{100}$ saved by the receiving device 102 from the first message. If the resulting value is the same as the value of $H_{100}$ saved by the receiving device 102 from the first message, then the receiving device 102 is assured that the sending device 100 is the sender of the second message. The receiving device 102 thus authenticates the second message as being sent from the sending device 100 and stores the value of $H_{99}$ for use in authenticating a next message from the sending device 100. If the resulting value is not the same as the value of $H_{100}$ saved by the receiving device 102 from the first message, then the receiving device 102 can discard or ignore the message.

As stated above, it is infeasible to find a value that will yield a particular hash. Thus, even when an adversary that observes the first message sent from the sending device 100 to the receiving device 102 or observes the value that the receiving device 102 has saved, the adversary cannot determine an $H_{99}$ to authenticate a new message. Generally, an adversary cannot learn or guess the original seed S (or, in general, any earlier value in the chain) because the sending device 100 can easily create and keep secret a random seed S that is infeasible for an adversary to guess by deriving such seeds from a root random quantity with high entropy. Further, it is assumed that an adversary cannot modify messages in transit from the sending device 100 to the receiving device 102 or block such a message and steal an authentication token to use in forging apparently authentic message. Thus, even if an adversary can observe the message that includes $H_{99}$ and was capable of sending a different message that includes $H_{99}$, the receiving device 102 would have received the intended message that includes $H_{99}$ from the sending device 100, and will be looking, in effect, for $H_{98}$ in the next authentic message.

There are many variations possible in the use of the above mechanism. For example, if the receiving device 102 can learn that the initial $H_{100}$ is from the sending device 100 in a secure way, then this can, for example, be used as a password mechanism, possibly authenticating sessions rather than messages. In addition, although the above example describes the receiving device 102 as a single entity, the messages from the sending device 100 could be sent to a group of receivers or even be a sequence of public messages. Additionally, it would also be possible for the receiving device 102 to also include a similar token in messages to the sending device 100 to verify that the messages are being sent by the receiving device 102, resulting in mutual or two-way authentication. The number of times the hash function is applied for the first token sent in the first message could be any number. Although, one hundred was used in the example above, the hash function could be applied two times, three times, ten times, one thousand times, or any other number. In some embodiments, if the initial seed S is the same size as the output of the hash function, the first application of Hash can be skipped, and S can be used directly as $H_1$. When a token is received in a message and authenticates that message, that token could be repeated in a response to, or acknowledgement of the message, as a proof of receipt.

In some embodiments, it is possible to compensate for a number of messages being lost or blocked in the network by having the receiver try multiple applications of the hash function. For example, assume the sending device 100 in its first message sends $H_{100}$ as the hash token, then in its second message sends $H_{99}$, and in its third message sends $H_{98}$. In the event that the second message that includes $H_{99}$ as the hash token is lost in the network, the receiving device 102 receives the first message and remembers $H_{100}$, never receives the second message, and then receives the third message with $H_{98}$ as the hash token. When the receiving device 102 checks the hash token in the third message (which is the second message the receiving device 102 receives) by applying the hash function, the check will fail because the $H_{100}$ value the receiving device 102 has saved does not equal the hash of the hash token in the third message (Hash($H_{98}$)). In some embodiments, to compensate for a single lost message, if the initial check by the receiving device 102 fails, as in this example, the receiving device 102 could then try applying the hash function twice to the hash token in the received message (Hash(Hash($H_{98}$))). Doing so, the receiving device 102 would determine that the result matches its saved value of $H_{100}$. In general, to compensate for up to M lost messages, the receiving device 102 would need to apply the hash function to the received token once and if the result does not equal its stored value, apply hash twice and if that result fails, apply hash thrice, etc., up to applying the hash function M times. The value of M could be preconfigured, pre-negotiated, or part of a standard for exchanging messages between the sending device 100 and the receiving device 102. When the sending device 100 runs out of values by sending $H_1$, the process as described initially above would need to repeat with the sending device 100 picking a new seed S' and recursively applying the hash function to the new seed S'.

In some embodiments, the security of the authentication provided may be improved by having parts of the path over which the messages with tokens in them are sent integrity checked and/or encrypted, particularly any parts of the path with a significant probability of message tampering. In some embodiments, to avoid some memory and/or computational burdens, the sender may include more than one hash token in a message where at least two of those tokens are different numbers of generations from their seed value.

As referenced herein, a generation is an application of the hash function. For example, a first-generation means that the hash function has been applied once to obtain a hash value, a second-generation means that the hash function has been applied twice to obtain a second-generation hash value (e.g., a hash of the first-generation hash value produces a second-generation hash value), a J-generation means the hash function has been applied J times to obtain a J-generation hash value, where J is an integer value greater than one. Similarly, a K-generation means the hash function has been applied K times to obtain a K-generation hash value, where K is an integer value greater than one. In some embodiments, the integer values of J and K can be the same value or can be different values.

Figure 2:
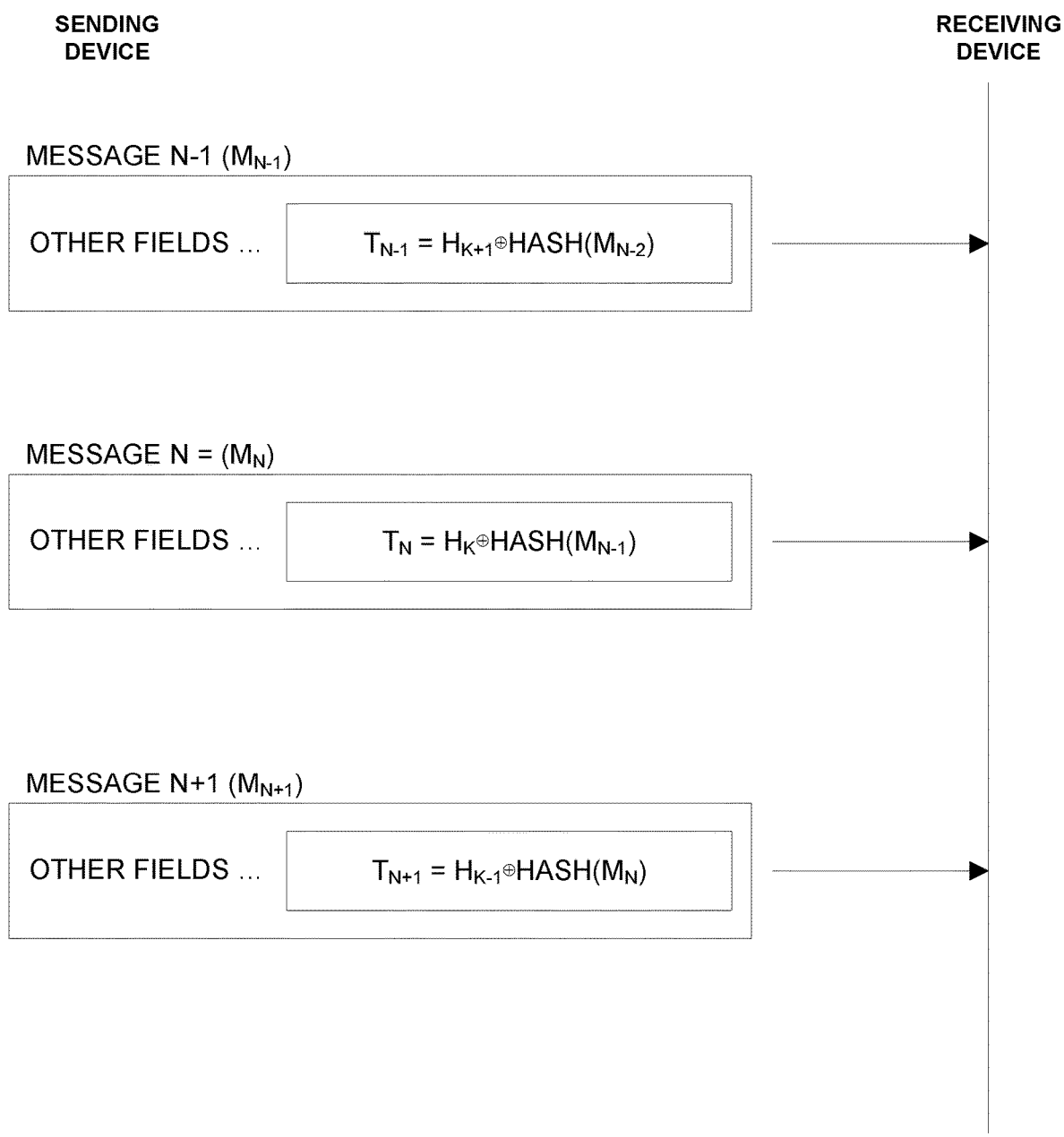
FIG. 2 is a schematic diagram illustrating an improved hash chaining security for a series of messages of a one-way message stream sent by a sending device to one or more receiving devices in accordance with an embodiment of the present disclosure.

FIG. 2 illustrates an improved hash chaining security for a series of messages of a one-way message stream sent by a sending device to one or more receiving devices in accordance with an embodiment of the present disclosure. The sending device combines the hash of the previous message sent in a reversible manner into the hash token in the current message. Thus, a message cannot be verified or forged without knowledge of the previous message requiring an adversary to intercept two sequential messages. A receiving device can use a stored hash of the previous message or stored copy of the previous message, if the hash is not stored, to determine whether a received message was sent by the same sender of a previous message, and whether the previous message was received complete and unaltered.

As an example, in FIG. 2, as part of a one-way message stream, the sending device sends a message N−1 ($M_{N-1}$), where N represents an arbitrary integer value. For example, N could be 100. Thus, message N−1 would be the $99^{th}$ message sent by the sending device in the one-way message stream. In the depicted embodiment, the message $M_{N-1}$ includes a hash token ($T_{N-1}$). The hash token is generated by performing a reversible combination, using a bitwise exclusive-or (XOR) Boolean function (represented by the symbol ⊕), that combines a particular hash chain value of a seed known only to the sending device and a hash of the last/previous message in the one-way message stream. XOR is a logical operator which results true (i.e., 1) when one operand is true and the other operand is false, otherwise the result is false (i.e., 0). For instance, 0 XOR 0 is 0, 0 XOR 1 is 1, 1 XOR 0 is 1, and 1 XOR 1 is 0. The XOR operation is reversible because the inverse of XOR is XOR. That is if C=A⊕B, then A=C⊕B and B=C⊕A. Thus, A can be determined if B and C are known, and B can be determined is A and C are known. However, C provides little to no information to the values A or B if neither value is known. Thus, an adversary having acquired the C value would not be able to decipher A or B without previous knowledge of A or B.

As described below, the receiving device stores the previous generation hash value and can store a hash of the previous message (or the actual prior message itself), which can be used to reverse the reversible combination hash token in a message to determine whether the message was received from the same sender as the prior message (based on hashing the previous generation hash value) and determine whether the prior message was received complete and unaltered (based on a comparison of the hash of the previous message).

Although the depicted embodiment uses the XOR operation/function for creating a reversible combination of a hash chain value and a hash of the previous message, the disclosed embodiments may use other reversible operations such as, but not limited to, a bitwise negation of XOR (commonly called "equivalence" (EQV) operation). The bitwise negation of XOR is the logical biconditional, which yields true if and only if the two inputs are the same. Other reversible combination function could include bit-wire rotations of either or both quantities being combined by XOR or EQV or rotation of the output. Also, the hash of the previous message could be used by the sender as a key to encrypt the hash chain token and to decrypt the combined token by the receiver. Or, as would be readily apparent to anyone skilled in the art, any combination of these or other reversible combination methods.

As shown in FIG. 2, in message $M_{N-1}$, the hash chain value is $H_{K+1}$, which is the K+1 generation hash of a seed. K can be any integer value greater than one. For example, if K is 10, then $H_{K+1}$ is the $11^{th}$ generation hash chain value of the seed. The hash chain value of $H_{K+1}$ is combined by the XOR operation with the hash the prior message sent by the sending device (Hash($M_{N-2}$)) to generate a hash token $T_{N-1}$ that is included in the message $M_{N-1}$.

Then, in the next message (message $M_N$) in a one-way message stream, the sending device includes a hash token $T_N$ that is a reversible combination of the next lower hash chain value ($H_K$) and a hash of the previous message (Hash($M_{N-1}$)). For instance, if K is 10 as stated above, the prior message $M_{N-1}$ had the $11^{th}$-generation hash value of the seed, and the current message $M_N$ has the $10^{th}$-generation hash value of the seed. The hash chain value enables the receiving device to verify that the message is from the same sending device that sent the prior message as described in FIG. 1. The hash of the previous message (Hash($M_{N-1}$)) included in the hash token $T_N$ can be used by the receiving device to verify that prior message was received complete and unaltered.

For instance, in an embodiment, when the receiving device receives the message $M_N$, the receiving device can authenticate message $M_N$ by extracting $T_N$ and calculating Hash($T_N$⊕Hash($M_{N-1}$)), which will be equal to Hash($H_K$) and comparing this with the value of $H_{K+1}$ from $T_{N-1}$. If the Hash($H_K$) is equal to the value of $H_{K+1}$ from $T_{N-1}$ then message $M_N$ is authenticated as being sent by the same sending device that sent message $M_{N-1}$, and further authenticates that message $M_{N-1}$ was received complete and unaltered. To successfully forge message $M_N$, an adversary must not only steal $T_{N-1}$ to use in the forged message, but must also have access to or control over message $M_{N-1}$. Thus, the disclosed embodiments increase or improve communication security by making message hijacking more difficult.

Similarly, in the next message $M_{N+1}$, the sending device includes a hash token that is a reversible combination of the next lower hash chain value ($H_{k-1}$) and a hash of the previous message (Hash($M_N$)), which can be used by the receiving device to verify whether message $M_{N+1}$ was sent by the same sending device that sent message $M_N$ and whether message $M_N$ was received complete and unaltered by the receiving device.

The disclosed embodiments can also apply to a two-way message stream. For example, assuming two parties, party B and party C are communicating. Hash chain techniques can be extended to provide mutual authentication and evidence of receipt to resist adversaries unless those adversaries have access to the messages in both directions between party B and party C. In cases where the messages from party B to party C and those from party C to party B follow different paths, it may be particularly difficult for an adversary to gain access to both flows. As an example, FIG. 3 illustrates an improved hash chaining security for a series of messages of a two-way message stream between a first device (party B) and a second device (party C) in accordance with a disclosed embodiment of the present disclosure. A non-limiting example of a two-way conversation is a request-response system, with both parties using hash tokens for authentication. In the depicted embodiment, both parties combine the hash of their most recently received message. Verification of the other party's hash token indicates correct receipt by that other party of the last message sent to them. For instance, as shown in FIG. 3, assume party C sends message $C_{M-1}$ to party B. In an embodiment, party C stores a hash of message $C_{M-1}$. In response to message $C_{M-1}$, party B sends message $B_{N-1}$ to party C. Party B includes hash token $T^B_{N-1}$ in the message $B_{N-1}$. Party B stores a hash of message $B_{N-1}$ for authenticating the next message received by party B. $T^B_{N-1}$ represents the hash token in message $B_{N-1}$. $T^B_{N-1}$ is computed as $T^B_{N-1} = H^B_{K+1} \oplus \text{Hash}(C_{M-1})$. $H^B_{K+1}$ is the K+1 generation hash value of seed B. $\text{Hash}(C_{M-1})$ is the hash of the message $C_{M-1}$ that was received by party B. When party C receives message $B_{N-1}$ from party B, party C can reverse the reversible combination in the hash token $T^B_{N-1}$ using party C's stored copy of $C_{M-1}$ or the hash of $C_{M-1}$ and extract $H^B_{K+1}$. Party C can then compare the stored $H^B_{K+2}$ received in the last message received by party C and the Hash of the extracted $H^B_{K+1}$. If the stored $H^B_{K+2}$ received in the last message received by party C and the Hash of the extracted $H^B_{K+1}$ are equal, then party B received message $C_{M-1}$ completely and unaltered and message $B_{N-1}$ was sent by the same sender that sent the last message received by party C (not shown).

After receiving message $B_{N-1}$, party C responds with message $C_M$ including hash token $T^C_M$ computed as $T^C_M = H^C_J \oplus \text{Hash}(B_{N-1})$. Party B receives message $C_M$ and reverses the $T^C_M$ to determine whether message $C_M$ was sent by the same sender that sent message $C_{M-1}$ and whether party C received message $B_{N-1}$ completely and unaltered using the stored hash of message $B_{N-1}$ and the stored value $H^C_{J+1}$ included in message $C_{M-1}$ (not shown). When the hash of $H^C_J$ is equal to the stored value of $H^C_{J+1}$, then message $C_M$ was sent by the same sender that sent message $C_{M-1}$ and that party C received message $B_{N-1}$ complete and unaltered.

The two-way communication continues with Party B, in its next message to C, namely message $B_N$, includes hash token $T^B_N$ computed as $T^B_N = H^B_K \oplus \text{Hash}(C_M)$. As described above, receipt of message $B_N$ and verification of $H^B_K$ by Party C implies that $B_N$ is from the same entity that sent message $B_{N-1}$ and that message $C_M$ was correctly received by Party B. Similarly, receipt of message $C_{M+1}$ and verification of $H^C_{J-1}$ by Party B implies that message $C_{M+1}$ is from the same sender that sent message $C_M$ and that message $B_N$ was correctly received by Party C. Continuing in this fashion, each party can authenticate the messages the party receives and the correct receipt of the preceding message that the party sent.

As stated above, the combining function used to produce the hash tokens from a hash chain value and the hash of a message could be some other function rather than XOR provided the operation reversibly combines the two values so that little to no information is revealed about either value individually. In some embodiments, Party B and Party C can save the most recent message received from the other or save the hash of that message and the hash sent in the hash token in that message.

In some embodiments, Party B and Party C can initially trust the first message received from the other (e.g., trust on first use (TOFU)) or the initial hash values ($H^B_N$ and $H^C_M$) could be communicated or $H^B_N$ and $H^C_M$ could be secured in some manner such as manual configuration or through a communication protocol. In addition, the initial message from Party B could be sent to multiple potential correspondents (party D, party E, and party F) and then different subsequent message exchange sequences held with each correspondent that responds.

In some embodiments, messages could contain two or more hash tokens in which case the previously sent message should be combined with the token to be used for authentication or with that token and with any hash token to be used for future authentication. Multiple hash tokens could be included with the same function except each hash token uses a different hash function.

In some embodiments, when computing a hash token, in addition to combining the most recently received message, the most recently sent message could also be included. So, in the example above, $T^C_M$ could be computed as $T^C_M = \text{Hash}(C_{M-1}) \oplus H^C_J \oplus \text{Hash}(B_{N-1})$ or even more of the earlier messages could be combined.

One skilled in the art would understand how to combine any or all of the above embodiments in a variety of permutations and combinations. Many other embodiments are possible as will be apparent to someone skilled in the art.

As discussed above, the security and traceability of dynamic address assignment protocols, particularly those related to assignment of Layer 2 addresses can be improved using the above processes. In particular, in certain embodiments, the successive multicast/broadcast messages sent by a client device during a self-assigned Layer 2 address process as descried above can have improved security by combining the previous message sent into the hash token so as to make such messages harder to forge. This improves the security and robustness of these self-assigned address methods. In an embodiment, for server-assigned addresses, the messages exchanged between a client and server can have improved security by combining the previous message received into the hash token so as to make such messages harder to forge and gain some assurance of the receipt of previous messages.

Figure 4:
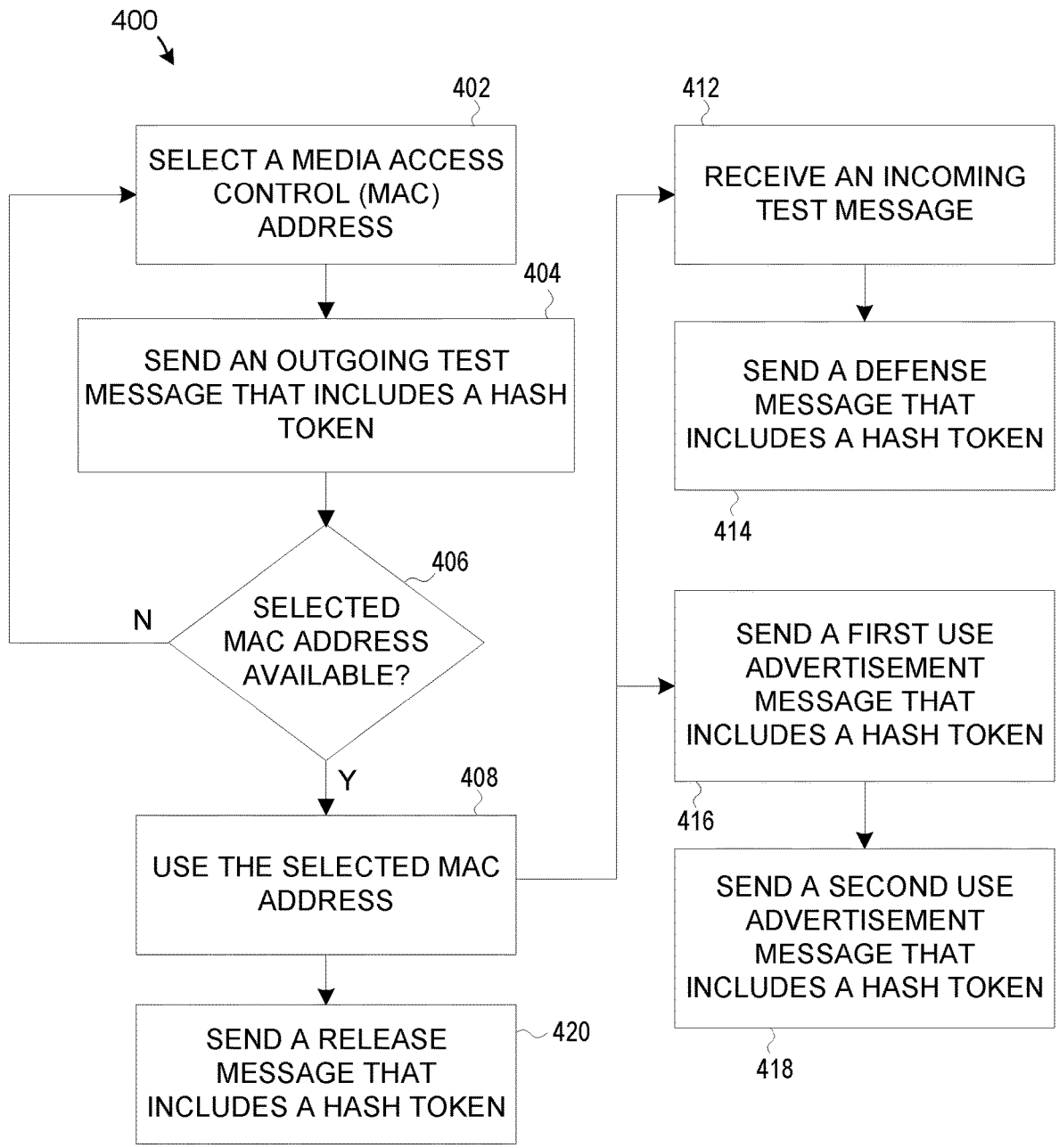
FIG. 4 is a flow chart illustrating an improved method for performing self-assignment Layer 2 address acquisition implemented by a client device in accordance with an embodiment of the present disclosure.

As an example, FIG. 4 is a flow chart illustrating an improved process 400 for performing self-assignment Layer 2 address acquisition in accordance with a disclosed embodiment of the present disclosure. In an embodiment, the improved process 400 for performing self-assignment Layer 2 address acquisition is implemented by a client device requiring a Layer 2 address, commonly called a MAC address.

At step 402, the client device selects a MAC address. A MAC address is a unique identifier assigned to a network interface controller (NIC) for use as a network address in communications within a network segment. This use is common in most IEEE 802 networking technologies, including Ethernet, Wi-Fi, and Bluetooth.

The client device, at step 404, sends an outgoing test message that includes a first hash token to test an availability of the selected MAC address. The first hash token includes a K generation hash ($H_K$) value of a seed known only to the client device. K can be any integer value greater than one. In an embodiment, the seed can be randomly generated by the client device.

At step 406, the client device determines whether the selected MAC address is in use based on any received responses to the outgoing test message. For instance, when the client device does not receive any defense messages within a certain period of time that indicates the selected MAC address is in use by another device/station in response to the outgoing test message, then the client device determines that the selected MAC address is available for use. If the client device does receive a defense message indicating that the selected MAC address is in use by another station, then the client device can return to step 402 and select another MAC address.

When the client device determines that the selected MAC address is available, the client device, at step 408, uses the selected MAC address as its MAC address. While the client device is using the selected MAC address, the client device may, at step 412, receive an incoming test message from another station testing the availability of the selected MAC address. In response to the incoming test message, the client device, at step 414, sends a defense message that includes a second hash token. In an embodiment, the defense message is multicast or broadcast out. The second hash token includes a reversible combination of a K−1 generation hash ($H_{K-1}$) value of the seed and a hash of the outgoing test message that was sent by the client device at step 404. For example, in an embodiment, the second hash token is equal to $H_{K-1} \oplus$ Hash(outgoing test message). Assuming the device/station receiving the defense message from the client device also received the outgoing test message from the client device that was sent at step 404 and stored $H_K$, the device/station receiving the defense message can decipher the second hash token and authenticate that the defense message was sent by the same device that sent the outgoing test message and that the outgoing test message was correctly received.

Additionally, in some embodiments, at step 416, the client device may send one or more advertisement messages advertising its use of the selected MAC address. For example, the client device may, at step 416, send a first use advertisement message that includes a second hash token (or third, fourth, or fifth hash token, etc., depending on the number of prior sent messages) to advertise the use of the selected MAC address by the client device. The second or subsequent hash token may include a reversible combination of a K−1 generation hash ($H_{K-1}$) value of the seed and a hash of the outgoing test message (or $H_{K-Q}$ value and a hash of the previous defense message if Q−2 were previously sent). Similarly, if the client device may send, at step 418, a second use advertisement message that includes a third hash token that includes a reversible combination of $H_{K-2}$ value and a hash of the first use advertisement message.

If and when the client device is done using the selected MAC address (e.g., because the client device is shutting down or for any other reason), at step 420, the client device may send a release message that the selected MAC address has been released by the client device. The release message also contains a hash token comprising a reversible combination of hash value of the seed and a hash of the last message sent by the client device. For instance, assuming that the only message that was previously sent out by the client device was the outgoing test message at step 404, then the hash token in the release message would comprise a reversible combination of a K−1 generation hash ($H_{K-1}$) value of the seed and a hash of the outgoing test message.

Figure 5:
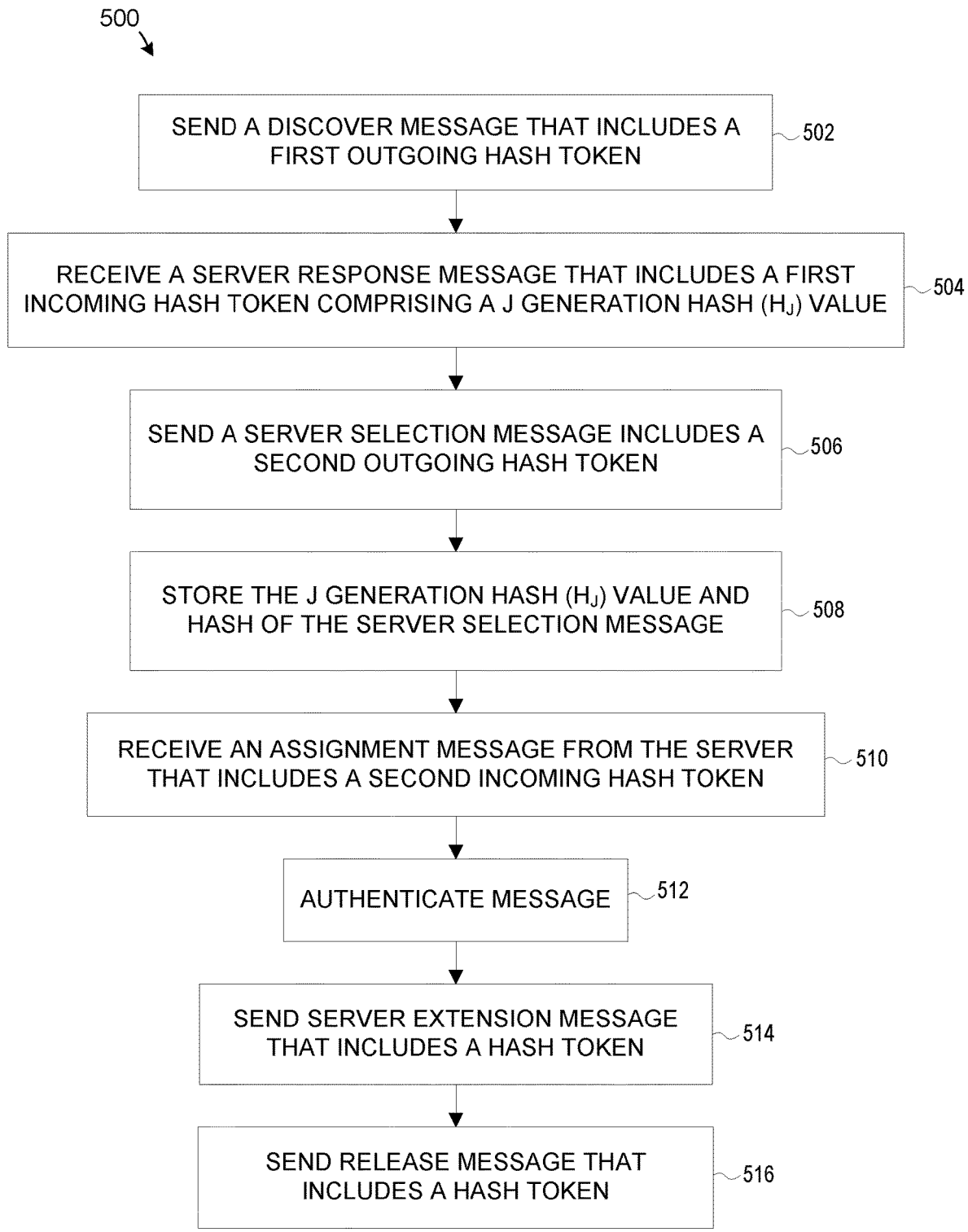
FIG. 5 is a flow chart illustrating an improved method for performing server-assigned Layer 2 address acquisition implemented by a client device in accordance with an embodiment of the present disclosure.

FIG. 5 is a flow chart illustrating an improved method 500 for performing server-assigned Layer 2 address acquisition in accordance with an embodiment of the present disclosure. In an embodiment, the improved process 500 for performing server-assigned Layer 2 address acquisition is implemented by a client device requiring a Layer 2 address.

At step 502, the client device sends a discover message to identify a server available to the client device. The discover message is normally broadcast or multicast so that all the stations on the logical link receives the message. The discover message includes a first outgoing hash token comprising a K generation hash ($H_K$) value of a first seed known only to the client device. K can be any integer value greater than one. In an embodiment, the first seed may be randomly generated by the client device. The discover message can include identification or authorization information for the client device, information as to a range of addresses the client device is requesting an address be allocated, and other information.

At step 504, the client device receives a server response message to the discover message from one or more servers. The server response message indicates if a server is willing to grant a Layer 2 address or block of addresses, a grant time period, and possibly other configuration parameters or information. In accordance with the disclosed embodiments, the server response message includes a first incoming hash token comprising a J generation hash ($H_J$) value of a second seed known only to the server that sent the server response message.

At step 506, the client device selects a server, if more than one is available, and sends a server selection message to the server. The server selection message includes a second outgoing hash token comprising a reversible combination (for example XOR) of a K−1 generation hash ($H_{K-1}$) value of the first seed and a hash of the server response message (e.g., second outgoing hash token is equal to $H_{K-1} \oplus$ Hash (server response message)). Other reversible operations may also be used for creating the reversible combination. The client device, at step 508, stores the J generation hash ($H_J$) value of the second seed and a hash of the server selection message for authenticating future messages from the server.

At step 510, the client device receives an assignment message from the server. The assignment message either indicates a positive acknowledgement confirming the assignment of a Layer 2 address, or block of addresses, or a negative acknowledgement refusing the assignment. In the positive case, the assignment message may include a "lease time" or the like indicating how long the client can use the Layer 2 address. The assignment message also includes a second incoming hash token comprising a reversible combination of a J−1 generation hash ($H_{J-1}$) value of the second seed and a hash of the server selection message. The client device, at step 512, authenticates the assignment message. In an embodiment, the client device determines whether a hash value of the J−1 generation hash ($H_{J-1}$) value is equal to the $H_J$ value stored by the client device. The client device authenticates the assignment message was sent by the server and verifies that the server selection message was received complete and unaltered by the server when the J−1 generation hash ($H_{J-1}$) value is equal to the $H_J$ value stored by the client device. Assuming the assignment message is authenticated and includes positive acknowledgement confirming the assignment of a Layer 2 address or block of addresses, the client device then uses the assigned Layer 2 address or block of addresses. If the assignment message includes a negative acknowledgement, then the client device client can try again with another server.

In the client device can send a server extension message that requests a time extension of the assignment of the Layer 2 address. The server extension message can include a third outgoing hash token comprising a reversible combination of a K−2 generation hash ($H_{K-2}$) value of the first seed and a hash of the assignment message.

If and when the client device is done using the selected MAC address, at step 516, the client device may send a release message. The release message also includes a hash token comprising a reversible combination of a last generation minus −1 hash value of the seed and a hash of the last message sent by the client device. For example, if the last message sent by the client device was a server extension message as described in step 514, the release message would include a fourth hash token comprising a reversible combination of a K−3 generation hash ($H_{K-3}$) value of the first seed and a hash of the server extension message.

Figure 6:
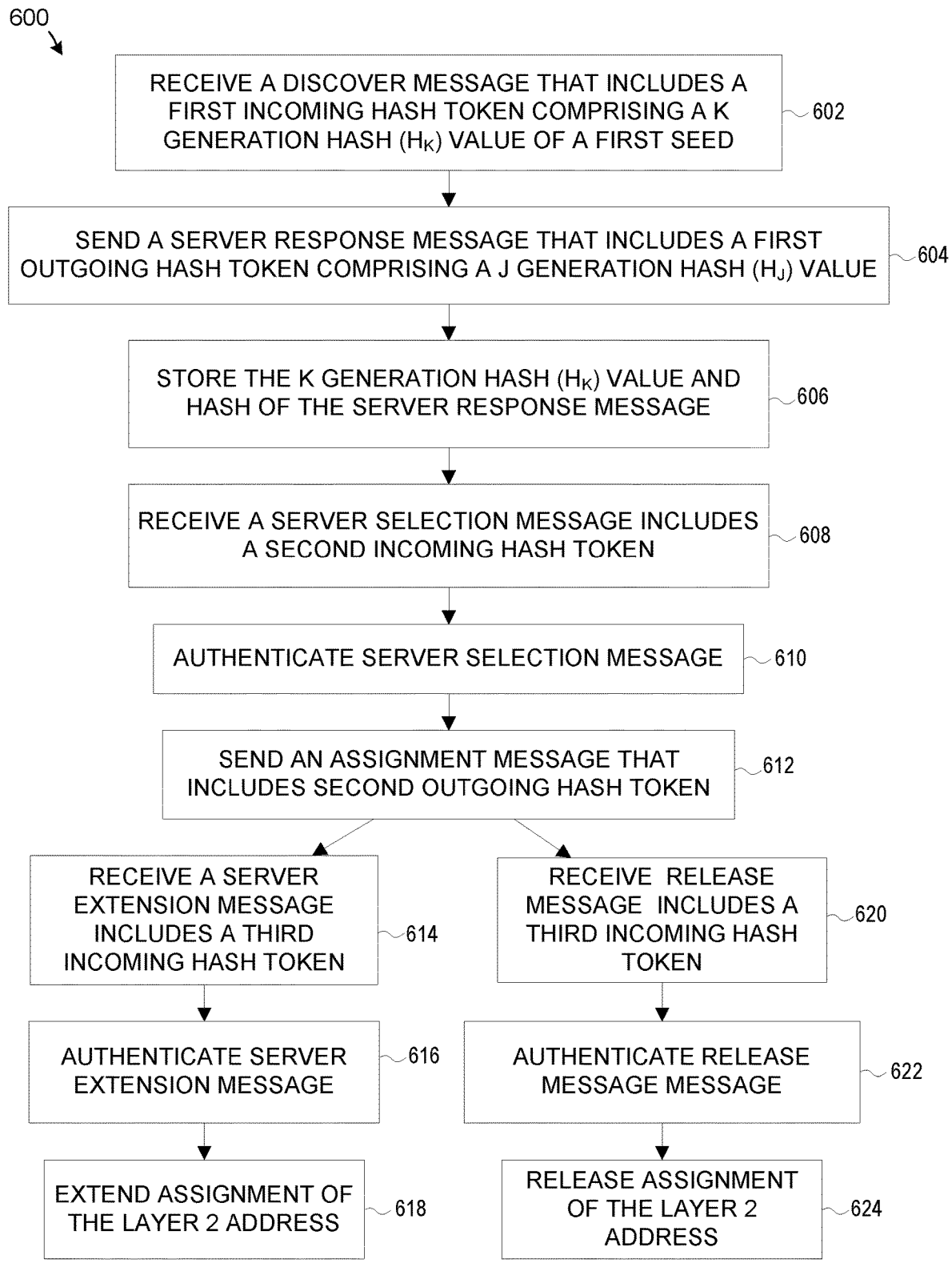
FIG. 6 is a flow chart illustrating an improved method for performing server-assigned Layer 2 address acquisition implemented by a server in accordance with an embodiment of the present disclosure.

FIG. 6 is a flow chart illustrating an improved method 600 for performing server-assigned Layer 2 address acquisition in accordance with an embodiment of the present disclosure. In an embodiment, the improved process 600 for performing server-assigned Layer 2 address acquisition is implemented by a server that allocates the use of a Layer 2 address or block of addresses.

At step 602, the server receives a discover message from a client device to identify a server available to the client device. The discover message includes a first incoming hash token comprising a K generation hash ($H_K$) value of a first seed known only to the client device. K can be any integer value greater than one. The discover message can include identification or authorization information for the client device, information as to a range of addresses from which the client device is requesting an address or addresses be allocated, and other information.

At step 604, the server sends a server response message in response to the discover message. The server response message indicates if the server is willing to grant a Layer 2 address or block of addresses, a grant time period, and possibly other configuration parameters or information. In accordance with the disclosed embodiments, the server response message includes a first outgoing hash token comprising a J generation hash ($H_J$) value of a second seed known only to the server.

At step 606, the server stores the K generation hash ($H_K$) value of a first seed and a hash of the server response message for authenticating future messages from the client device.

The server, at step 608, receives a server selection message from the client device. The server selection message includes a second incoming hash token comprising a reversible combination of a K−1 generation hash ($H_{K-1}$) value of the first seed and a hash of the server response message.

At step 610, the server authenticates the server selection message. In an embodiment, the server determines whether a hash value of the K−1 generation hash ($H_{K-1}$) value in the second incoming hash token is equal to the $H_K$ value stored by the server. The server authenticates the server selection message was sent by the client device and verifies that the server response message was received complete and unaltered by the client device when the hash value of the K−1 generation hash ($H_{K-1}$) value in the second incoming hash token is equal to the $H_K$ value stored by the server.

At step 612, the server sends an assignment message to the client device. The assignment message either indicates a positive acknowledgement confirming the assignment of a Layer 2 address, or block of addresses, or a negative acknowledgement refusing the assignment. In the positive case, the assignment message may include a "lease time" or the like indicating how long the client can use the Layer 2 address. The assignment message also includes a second outgoing hash token comprising a reversible combination of a J−1 generation hash ($H_{J-1}$) value of the second seed and a hash of the server selection message.

Assuming the assignment message indicates a positive acknowledgement confirming the assignment of a Layer 2 address, the server can receive either a server extension message from the client device that requests a time extension of the assignment of the Layer 2 address at step 614 or a release message from the client device that releases the assignment of the Layer 2 address at step 620. In either case, the server extension message and the release message could include a third incoming hash token comprising a reversible combination of a K−2 generation hash ($H_{K-2}$) value of the first seed and a hash of the assignment message. Respectively, the server, at step 616 and 622, could authenticate the server extension message or the release message by determining whether a hash value of the K−2 generation hash ($H_{K-2}$) value in the third incoming hash token is equal to a $H_{K-1}$ value stored by the server. Although not shown, the server could also receive a server extension message from the client device and later receive a release message from the client device that releases the assignment of the Layer 2 address. Following the authentication of the server extension message, the server, at step 618, extends the assignment time of the Layer 2 address or block of addresses for use by the client device. Following the authentication of the release message, the server, at step 624, releases the assignment of the Layer 2 address or block of addresses from the client device (i.e., making the Layer 2 address or block of addresses available to other client devices.)

Figure 7:
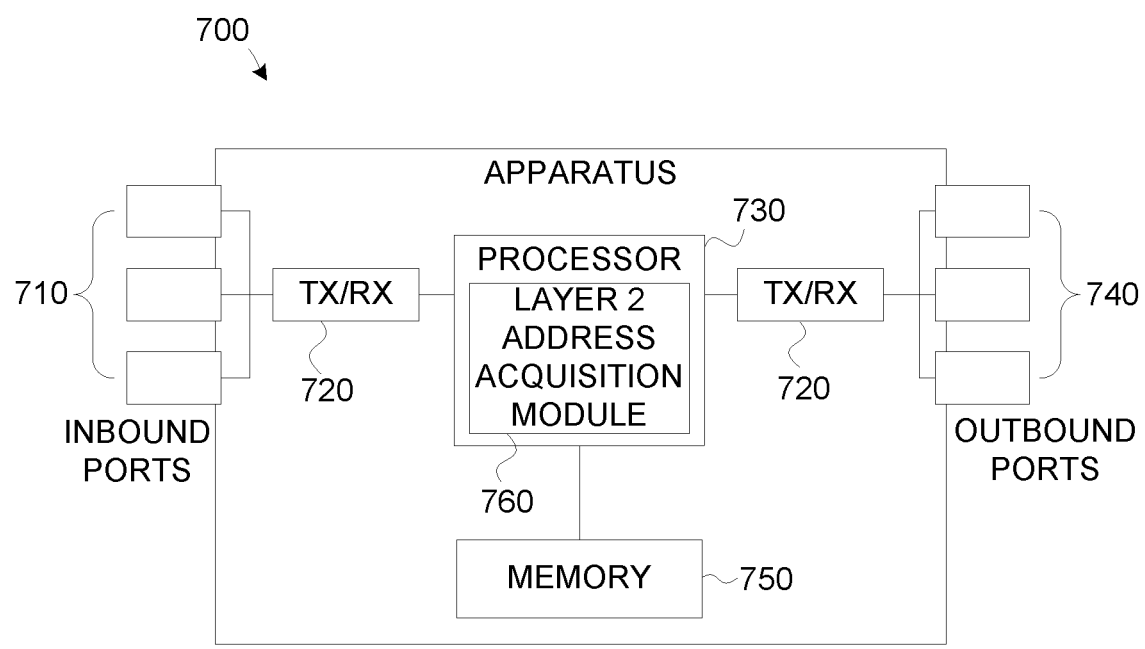
FIG. 7 is a schematic diagram of an apparatus configured to implement one or more of the methods disclosed herein according to an embodiment of the disclosure.

FIG. 7 is a schematic diagram of an apparatus 700 configured to implement one or more of the methods disclosed herein according to an embodiment of the disclosure. For example, the apparatus 700 may represent the sending device 100, the receiving device 102, a client device, and/or a server as described herein. The apparatus 700 comprises ingress ports 710 and receiver units (Rx) 720 for receiving messages, a processor, logic unit, or central processing unit (CPU) 730 to process the messages, transmitter units (TX) 720 and egress ports 740 for transmitting the messages, and a memory 750.

The processor 730 is implemented by any suitable combination of hardware, middleware, and firmware. The processor 730 may be implemented as one or more CPU chips, cores (e.g., as a multi-core processor), field-programmable gate arrays (FPGAs), application specific integrated circuits (ASICs), or digital signal processors (DSPs). The processor 730 is in communication with the ingress ports 710, receiver units 720, transmitter units 720, egress ports 740, and memory 750.

The memory 750 comprises one or more disks, tape drives, or solid-state drives and may be used as an over-flow data storage device, to store programs when such programs are selected for execution, or to store instructions and data that are read during program execution. The memory 750 may be volatile and/or non-volatile and may be read-only memory (ROM), random-access memory (RAM), ternary content-addressable memory (TCAM), or static random-access memory (SRAM). In one embodiment, the memory 750 comprises a Layer 2 address acquisition module 760. The Layer 2 address acquisition module 760 comprises executable instructions and data configurations that when executed by the processor 730 implements the disclosed embodiments as described herein.

While several embodiments have been provided in the present disclosure, it should be understood that the disclosed systems and methods might be embodied in many other specific forms without departing from the spirit or scope of the present disclosure. A person skilled in the art would understand how to combine any or all of the above techniques in a vast variety of permutations and combinations.

The present examples are to be considered as illustrative and not restrictive, and the intention is not to be limited to the details given herein. For example, the various elements or components may be combined or integrated in another system or certain features may be omitted, or not implemented.

These disclosed embodiments improve the security of hash chaining by providing assurances of receipt by the other party in both one-way communications and in a two-way conversation of previous messages. In particular, the reversible combining of the hash of one or more previous messages into the hash chaining hash token of the message to be transmitted in a manner that reveals little to no information about the quantities combined enables both hash chain verification of the hash token to authenticate a sender of a message as well authenticate receipt of one or more earlier messages. Use of the disclosed embodiments provide improved security by requiring an adversary to intercept earlier messages in order to be able to forge an apparently authentic message. In particular, the security and traceability of dynamic address assignment protocols, particularly those related to assignment of Layer 2 addresses can be improved using the above disclose embodiments.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for performing self-assignment Layer 2 address acquisition implemented by a client device, the method comprising:
   selecting a Media Access Control (MAC) address;
   generating an outgoing test message that includes a first hash token to test an availability of the selected MAC address, the first hash token comprising a K generation hash ($H_K$) value of a seed known only to the client device, wherein K is an integer value greater than one;
   sending the outgoing test message;
   determining based on a response to the outgoing test message or a lack of a response to the outgoing test message that the selected MAC address is not in use; and
   using the selected MAC address based on the determination that the selected MAC address is not in use.

2. The method of claim 1, further comprising:
   receiving an incoming test message testing the availability of the selected MAC address;
   generating a defense message that includes a second hash token in response to the incoming test message, the second hash token comprising a reversible combination of a K−1 generation hash ($H_{K-1}$) value of the seed and a hash of the outgoing test message; and
   sending the defense message.

3. The method of claim 1, further comprising:
   generating a first use advertisement message that includes a second hash token comprising a first reversible combination of a K−1 generation hash ($H_{K-1}$) value of the seed and a hash of the outgoing test message, wherein the first use advertisement message advertises a use of the selected MAC address; and
   sending the first use advertisement message.

4. The method of claim 3, further comprising:
   generating a second use advertisement message that includes a third hash token comprising a second reversible combination of a K−2 generation hash ($H_{K-2}$) value of the seed and a hash of the first use advertisement message, wherein the second use advertisement message advertises the use of the selected MAC address; and
   sending the second use advertisement message.

5. The method of claim 1, further comprising:
   generating a release message that includes a second hash token comprising a reversible combination of a K−1 generation hash ($H_{K-1}$) value of the seed and a hash of the outgoing test message, wherein the release message indicating a release of the selected MAC address; and
   sending the release message.

6. The method of claim 1, further comprising:
   generating a message that includes a hash token comprising a reversible combination of an X generation hash value of the seed and a hash of a last message sent by the client device, where X generation hash is equal to one less than a last generation hash used in generating a last hash token included in the last message sent by the client device; and
   sending the message.

7. A method for performing server-assigned Layer 2 address acquisition implemented by a client device, the method comprising:
   sending a discover message to identify a server available to the client device, wherein the discover message includes a first outgoing hash token comprising a K generation hash ($H_K$) value of a first seed known only to the client device, where K is an integer value greater than one;
   receiving a server response message to the discover message from the server, wherein the server response message includes a first incoming hash token comprising a J generation hash ($H_J$) value of a second seed known only to the server; and
   sending a server selection message to the server, wherein the server selection message includes a second outgoing hash token comprising a first reversible combination of a K−1 generation hash ($H_{K-1}$) value of the first seed and a hash of the server response message.

8. The method of claim 7, further comprising storing the $H_J$ value of the second seed.

9. The method of claim 7, further comprising storing a hash of the server selection message.

10. The method of claim 8, further comprising receiving an assignment message from the server that includes a second incoming hash token comprising a second reversible combination of a J−1 generation hash ($H_{J-1}$) value of the second seed and a hash of the server selection message, wherein the assignment message confirms or refuses an assignment of a Layer 2 address.

11. The method of claim 10, further comprising:
   determining whether a hash value of the J−1 generation hash ($H_{J-1}$) value is equal to the $H_J$ value stored by the client device; and
   authenticating the assignment message was sent by the server and verifying the server selection message was received complete and unaltered by the server when the $H_{J-1}$ value is equal to the $H_J$ value stored by the client device.

12. The method of claim 10, further comprising:
generating a third outgoing hash token comprising a reversible combination of a K−2 generation hash ($H_{K-2}$) value of the first seed and a hash of the assignment message; and
sending a server extension message that includes the third outgoing hash token to the server, wherein the server extension message requests a time extension of the assignment of the Layer 2 address.

13. The method of claim 10, further comprising:
generating a third outgoing hash token comprising a third reversible combination of a K−2 generation hash ($H_{K-2}$) value of the first seed and a hash of the assignment message; and
sending a release message that includes the third outgoing hash token to the server, wherein the release message releases the assignment of the Layer 2 address.

14. A method for performing server-assigned Layer 2 address acquisition implemented by a server, the method comprising:
receiving a discover message from a client device, wherein the discover message includes a first incoming hash token comprising a K generation hash ($H_K$) value of a first seed known only to the client device, where K is an integer value greater than one;
generating a server response message to the discover message that includes a first outgoing hash token comprising a J generation hash ($H_J$) value of a second seed known only to the server;
sending the server response message to the client device; and
receiving a server selection message from the client device that includes a second incoming hash token comprising a first reversible combination of a K−1 generation hash ($H_{K-1}$) value of the first seed and a hash of the server response message.

15. The method of claim 14, further comprising storing the $H_K$ value of the first seed.

16. The method of claim 14, further comprising storing a hash of the server response message.

17. The method of claim 15, further comprising:
determining whether a hash value of the $H_{K-1}$ value in the second incoming hash token is equal to the $H_K$ value stored by the server; and
authenticating the server selection message was sent by the client device and verifying the server response message was received complete and unaltered by the client device when the hash value of the $H_{K-1}$ value in the second incoming hash token is equal to the $H_K$ value stored by the server.

18. The method of claim 14, further comprising:
generating an assignment message that includes a second outgoing hash token comprising a second reversible combination of a J−1 generation hash ($H_{J-1}$) value of the second seed and a hash of the server selection message, wherein the assignment message confirms or refuses an assignment of a Layer 2 address; and
sending the assignment message to the client device.

19. The method of claim 18, further comprising:
receiving a server extension message from the client device that includes a third incoming hash token comprising a third reversible combination of a K−2 generation hash ($H_{K-2}$) value of the first seed and a hash of the assignment message, wherein the server extension message requests a time extension of the assignment of the Layer 2 address.

20. The method of claim 19, further comprising:
determining whether a hash value of the K−2 generation hash ($H_{K-2}$) value in the third incoming hash token is equal to the $H_{K-1}$ value stored by the server; and
authenticating the server extension message was sent by the client device and verifying the assignment message was received complete and unaltered by the client device when the hash value of the K−2 generation hash ($H_{K-2}$) value in the third incoming hash token is equal to the $H_{K-1}$ value stored by the server.

* * * * *

UNITED STATES PATENT AND TRADEMARK OFFICE
CERTIFICATE OF CORRECTION

PATENT NO. : 12,445,315 B2  
APPLICATION NO. : 18/356732  
DATED : October 14, 2025  
INVENTOR(S) : Donald E. Eastlake, III Page 1 of 1

It is certified that error appears in the above-identified patent and that said Letters Patent is hereby corrected as shown below:

In the Claims

Column 22, Claim 20, Line 37, delete "$H_g\_1$ value" and insert -- $H_{g-1}$ value --.

Signed and Sealed this  
Ninth Day of December, 2025

John A. Squires  
*Director of the United States Patent and Trademark Office*